United States Patent
Cunningham

(10) Patent No.: US 11,017,670 B2
(45) Date of Patent: May 25, 2021

(54) INTERMEDIATE VEHICLE REPEATER FOR OUT OF RANGE VEHICLES

(71) Applicant: Toyota Motor Engineering & Manufacturing North America, Inc., Plano, TX (US)

(72) Inventor: Drew Cunningham, Superior Township, MI (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 282 days.

(21) Appl. No.: 16/054,201

(22) Filed: Aug. 3, 2018

(65) Prior Publication Data

US 2020/0043342 A1    Feb. 6, 2020

(51) Int. Cl.
| | |
|---|---|
| G08G 1/16 | (2006.01) |
| H04W 4/46 | (2018.01) |
| H04W 88/04 | (2009.01) |
| B60W 40/06 | (2012.01) |
| H04W 4/06 | (2009.01) |
| H04W 4/80 | (2018.01) |
| B60W 30/095 | (2012.01) |
| H04W 4/02 | (2018.01) |
| G08G 1/01 | (2006.01) |
| G08G 1/0967 | (2006.01) |

(52) U.S. Cl.
CPC ......... *G08G 1/163* (2013.01); *B60W 30/0953* (2013.01); *B60W 40/06* (2013.01); *G08G 1/0104* (2013.01); *G08G 1/096791* (2013.01); *H04W 4/02* (2013.01); *H04W 4/06* (2013.01); *H04W 4/46* (2018.02); *H04W 4/80* (2018.02); *H04W 88/04* (2013.01); *B60W 2756/10* (2020.02)

(58) Field of Classification Search
CPC .. G08G 1/163; G08G 1/161; G08G 1/096791; G08G 1/0104; H04W 4/46; H04W 88/04; H04W 4/06; H04W 4/80; H04W 4/02; H04W 4/024; H04W 40/22; H04W 4/40; B60W 40/06; B60W 30/0953; B60W 2756/10; B60W 40/04; B60W 2050/048; B60W 2050/046
See application file for complete search history.

(56) References Cited

U.S. PATENT DOCUMENTS

| | | | |
|---|---|---|---|
| 3,750,020 A | * | 7/1973 | Baba .................... H04B 5/0018 455/14 |
| 6,785,511 B1 | | 8/2004 | Hengeveld |
| 9,836,976 B2 | | 12/2017 | Probert |
| 9,959,752 B2 | | 5/2018 | Rech |

(Continued)

*Primary Examiner* — Russell Frejd
(74) *Attorney, Agent, or Firm* — Sheppard, Mullin, Richter & Hampton LLP; Hector A. Agdeppa; Daniel N. Yannuzzi

(57) ABSTRACT

Vehicle-to-vehicle (V2V) communication through short range communication techniques can be extended by sending messages from a host vehicle to a target vehicle using an intermediate vehicle. The host vehicle identifies road conditions which may be of interest to a target vehicle. An intermediate vehicle relays the message detailing the identified road conditions from the host vehicle to the target vehicle. The message can be rebroadcast by the intermediate vehicle to target vehicles in its communication range, or it can generate a new message to transmit the information to target vehicles.

17 Claims, 8 Drawing Sheets

(56) References Cited

U.S. PATENT DOCUMENTS

| | | | |
|---|---|---|---|
| 2004/0192193 A1* | 9/2004 | Silvester | H04B 7/155 |
| | | | 455/11.1 |
| 2005/0148334 A1* | 7/2005 | Peeters | H04M 1/6091 |
| | | | 455/436 |
| 2010/0234071 A1 | 9/2010 | Shabtay | |
| 2012/0022741 A1* | 1/2012 | Moore | H04W 8/24 |
| | | | 701/31.4 |
| 2013/0086164 A1 | 4/2013 | Wheeler | |
| 2015/0061895 A1* | 3/2015 | Ricci | G06Q 10/20 |
| | | | 340/902 |
| 2018/0052455 A1* | 2/2018 | Hutchins | B61L 3/127 |
| 2018/0184270 A1* | 6/2018 | Chun | H04W 24/08 |

* cited by examiner

INTERMEDIATE VEHICLE REPEATER FOR OUT OF RANGE VEHICLES

TECHNICAL FIELD

The disclosed technology relates generally to wireless communications between vehicles, and more particularly, some embodiments relate to methods and systems for extending wireless communication capabilities between vehicles.

DESCRIPTION OF THE RELATED ART

Intelligent Transportation Systems (ITS) are applications that provide services pertaining to modes of transport and traffic management. Various forms of wireless communications technologies have been proposed for intelligent transportation systems. Shorter range communications, which are typically no greater than 350 meters between the two entities, can be accomplished using wireless access in vehicular environments (WAVE) and dedicated short range communications (DSRC) standards, as promoted by the United States Department of Transportation.

Vehicle-to-infrastructure (V2I) is a type of intelligent transportation system that captures vehicle-generated traffic data from infrastructure on which a vehicle drives on or is exposed to. In turn, V2I wirelessly sends the data from the infrastructure to the vehicle as advisories.

Vehicle-to-vehicle (V2V) is a type of intelligent transportation system technology that allows two or more distinct vehicles to wirelessly communicate with each other. Ad hoc wireless networks are formed on the roads on which these vehicles drive. The formed ad hoc wireless networks are also referred to as vehicular ad hoc networks (VANETs). DSRC (Dedicated Short Range Communications) is a one-way or two-way short-range to medium-range wireless communication channel used for V2V communication. In the United States, 75 megahertz (MHz) of spectrum are allocated in a 5.9 gigahertz (GHz) band for DSRC. In Europe, 30 MHz of spectrum are allocated in a 5.9 GHz band for DSRC. In other regions of the world, infrared, different baud rates, and protocols are implemented for DSRC. Other communication protocols or capabilities may also be utilized for wireless communication among vehicles.

A host vehicle may be present with a plurality of other vehicles within a communication vicinity of the host vehicle. A group of vehicles is created to include the host vehicle and the plurality of other vehicles. Each vehicle within the group of vehicles may communicate with each other using V2V technology or like technologies. In operation, a host vehicle may detect any of a number of roadway conditions using one or more of a plurality of vehicle sensors. When a condition of interest is detected, the host vehicle may communicate that information to other vehicles within its group (i.e. to other vehicles within communication range of the host vehicle) to alert them of the possible condition. For example, a host vehicle may use DSRC to alert drivers in target vehicles of conditions such as: lateral crossing traffic at an upcoming intersection (e.g., for Intersection Movement Assist); slower moving, slowing or stop vehicles in the path of travel (e.g., Forward-Collision Warning); the presence of vehicles in adjacent lanes when changing lanes (e.g. Blind Spot Warning/Lane Change Warning); and others.

The communication range for V2V messages is limited. In some intelligent vehicle systems, infrastructure elements may be used as repeaters to allow messages from a host vehicle to reach one or more target vehicles even though the target vehicles may be out of communication range of the host vehicle. However, these infrastructure elements are not always available.

BRIEF SUMMARY OF EMBODIMENTS

Embodiments of the technology disclosed herein are directed toward devices and methods for extending wireless communication capabilities between vehicles. According to one embodiment of the disclosed technology, A method may include: obtaining data on road conditions containing at least a first vehicle and a second vehicle, at a third vehicle; sending the obtained data on the road conditions from the third vehicle to the first vehicle; identifying a triggering condition within the obtained data on the road conditions, at the first vehicle, wherein the triggering condition affects at least one of: the first vehicle and the second vehicle; determining a location of the first vehicle relative to a location of the second vehicle is outside a communications threshold, at the third vehicle; and sending a message detailing the triggering condition from the first vehicle to the second vehicle by using the third vehicle as a relay.

In various embodiments, determining the location of the first vehicle relative to the location of the second vehicle is outside the communications threshold may include: establishing a first connection between the third vehicle to the first vehicle; and establishing a second connection between the third vehicle to the second vehicle. Identifying the triggering condition may include: analyzing the obtained data to identify a portion of the road conditions contributing to the triggering condition; processing state dynamics of the second vehicle; determining a communication blockage between the first vehicle and the second vehicle; and detecting a signal from the first vehicle, wherein the signal is determined to be unstable by the third vehicle.

In some applications, sending the message from the first vehicle to the second vehicle may include: verifying the first vehicle as a trusted source for the second vehicle by using dedicated short range communication (DSRC) messaging protocols at the third vehicle; altering and security resigning the message by using the third vehicle as the relay; and retransmitting the message to the second vehicle, in response to altering and security reassigning the message. Retransmitting the message to the second vehicle may include: decoding a basic safety message system residing in the third vehicle, at the second vehicle; and outputting the message to the second vehicle as if the first vehicle directly sends the message to the second vehicle.

Various triggering conditions may include, for example, traction control loss of the first vehicle; brake failure in the first vehicle; possible collision between the first and the second vehicle; movement and position by first vehicle requiring a reaction by the second vehicle; and maneuvers attempting to pass the first vehicle is risky to the second vehicle.

In further embodiments, a method may include: obtaining data on road conditions containing at least a first vehicle and a second vehicle, at a third vehicle; sending the obtained data on the road conditions from the third vehicle to the first vehicle; identifying a triggering condition within the obtained data on the road conditions, at the first vehicle, wherein the triggering condition affects at least one of: the first vehicle and the second vehicle; determining a location of the first vehicle relative to a location of the second vehicle is outside a communications threshold, at the third vehicle; determining whether dedicated short range communication (DSRC) traffic exceeds a network traffic threshold; and sending a message detailing the triggering condition from the first vehicle to the second vehicle by using the third vehicle as a relay.

Determining the DSRC traffic exceeds the network traffic threshold may include disabling at least in part of an entirety of a repeater feature of the first vehicle. Determining the location of the first vehicle relative to the location of the second vehicle is outside the communications threshold may include: establishing a first connection between the third vehicle to the first vehicle; and establishing a second connection between the third vehicle to the second vehicle.

Identifying the triggering condition may include: analyzing the obtained data to identify a portion of the road conditions contributing to the triggering condition; processing state dynamics of the second vehicle; determining a communication blockage between the first vehicle and the second vehicle; and detecting a signal from the first vehicle, wherein the signal is determined to be unstable by the third vehicle.

Sending the message from the first vehicle to the second vehicle may include: verifying the first vehicle as a trusted source for the second vehicle by using dedicated short range communication (DSRC) messaging protocols at the third vehicle; altering and security resigning the message by using the third vehicle as the relay; and retransmitting the message to the second vehicle, in response to altering and security reassigning the message. Retransmitting the message to the second vehicle may include: decoding a basic safety message system residing in the third vehicle, at the second vehicle; and outputting the message to the second vehicle as if the first vehicle directly sends the message to the second vehicle.

Various identified scenarios may include: traction control loss of the first vehicle; brake failure in the first vehicle; possible collision between the first and the second vehicle; movement and position by first vehicle requiring a reaction by the second vehicle; and maneuvers attempting to pass the first vehicle is risky to the second vehicle.

In still further embodiments, a computer system, may include: one or more computer processors; one or more repeater features; one or more sensors; one or more user interfaces; one or more computer readable storage media; program instructions stored on the one or more computer readable storage media for execution by at least one of the one or more processors. The program instructions may include: program instructions to obtain data on road conditions containing at least a first vehicle and a second vehicle, at a third vehicle; program instructions to send the obtained data on the road conditions from the third vehicle to the first vehicle; program instructions to identify a triggering condition within the obtained data on the road conditions, at the first vehicle, wherein the triggering condition affects at least one of: the first vehicle and the second vehicle; program instructions to determine a location of the first vehicle relative to a location of the second vehicle is outside a communications threshold, at the third vehicle; program instructions to determine whether dedicated short range communication (DSRC) traffic exceeds a network traffic threshold; and sending a message detailing the triggering condition from the first vehicle to the second vehicle by using the third vehicle as a relay.

Program instructions to determine the DSRC traffic exceeds the network traffic threshold, may include: program instructions to disable at least in part of an entirety of at least one repeater feature in the first vehicle of the one or more repeater features.

Program instructions to determine the location of the first vehicle relative to the location of the second vehicle is outside the communications threshold, may include: program instructions to establish a first connection between the third vehicle to the first vehicle; and program instructions to establish a second connection between the third vehicle to the second vehicle.

Program instructions to identify the triggering condition, may include: program instructions to analyze the obtained data to identify a portion of the road conditions contributing to the triggering condition; program instructions to process state dynamics of the second vehicle; program instructions to determine a communication blockage between the first vehicle and the second vehicle; and program instruction to detect a signal from the first vehicle, wherein the signal is determined to be unstable by the third vehicle. 1

Program instructions to send the message from the first vehicle to the second vehicle, may include: program instructions to verify the first vehicle as a trusted source for the second vehicle by using dedicated short range communication (DSRC) messaging protocols at the third vehicle; program instructions to alter and security resign the message by using the third vehicle as the relay; and program instructions to retransmit the message to the second vehicle, in response to altering and security reassigning the message. Program instructions to retransmit the message to the second vehicle may include: decoding a basic safety message system residing in the third vehicle, at the second vehicle; and outputting the message to the second vehicle as if the first vehicle directly sends the message to the second vehicle.

BRIEF DESCRIPTION OF THE DRAWINGS

The technology disclosed herein, in accordance with one or more various embodiments, is described in detail with reference to the following figures. The drawings are provided for purposes of illustration only and merely depict typical or example embodiments of the disclosed technology. These drawings are provided to facilitate the reader's understanding of the disclosed technology and shall not be considered limiting of the breadth, scope, or applicability thereof. It should be noted that for clarity and ease of illustration these drawings are not necessarily made to scale.

Figure 1A:
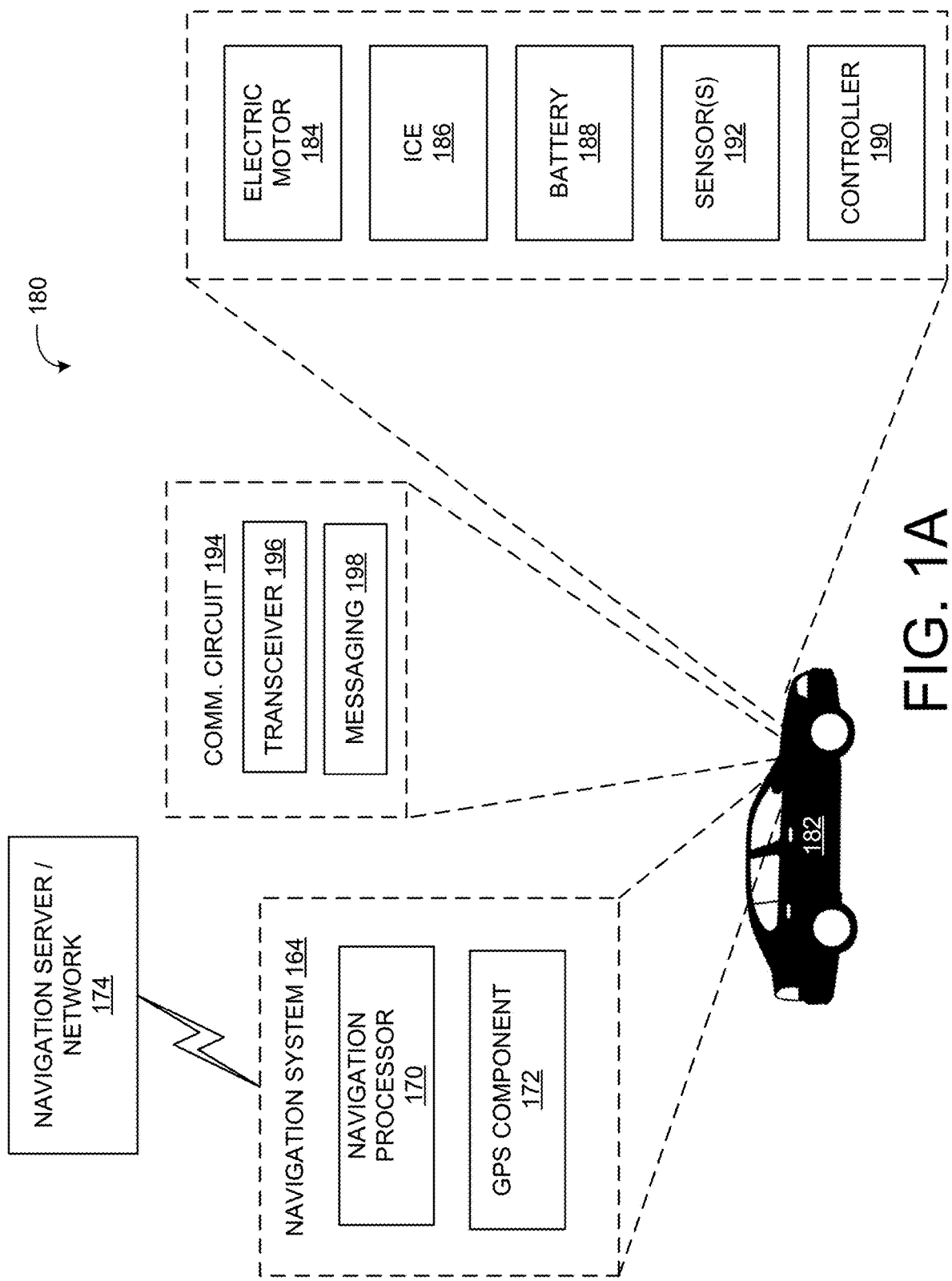
FIG. 1A illustrates an example of a vehicle with which various embodiments of the systems and methods disclosed herein may be implemented.

The figures are not intended to be exhaustive or to limit the invention to the precise form disclosed. It should be understood that the invention can be practiced with modification and alteration, and that the disclosed technology be limited only by the claims and the equivalents thereof.

DETAILED DESCRIPTION OF THE EMBODIMENTS

Embodiments of the technology disclosed herein are directed toward methods and systems for extending communication capabilities between vehicles in the event of range, interference, blockage, or other complications. When a host vehicle detects a condition that may be of interest to drivers of other vehicles who are in the vicinity of, or who are likely to be in the vicinity of, the detected condition, the host vehicle may send a wireless message to those other vehicles (referred to herein as target vehicles) to alert them of the condition. Dedicated Short Range Communication (DSRC) technology, or other wireless communication capabilities, may be leveraged to allow the host vehicle to communicate the detected condition.

In order to extend the range of communication among a host vehicle and one or more intended target vehicles, one or more other vehicles within range of the host vehicle may act as a communication relay. Such an intermediate vehicle, or relay vehicle, may receive the condition message from the host, determine that the received condition message should be relayed to an out of range target, and relay the condition message to the target vehicle.

An intermediate vehicle may be configured to determine whether a message broadcast from a host is intended for other target vehicles and to determine whether one or more of those other target vehicles is out of range of the host but within range of the intermediate vehicle. For example, the intermediate vehicle may receive a condition message from a host vehicle and determine that the target vehicle is too far away from the host vehicle to receive the condition message. The out-of-range condition may be detected, for example, by the intermediate vehicle measuring the received signal strength of communications from the target vehicle and a host vehicle and determining that the vehicles are out of range. As another example, the intermediate vehicle may receive GPS position information, or other position information, from the host vehicle and target vehicle and determined based on the separation distance between the vehicles that they are out of communication range. As yet a further example, the intermediate vehicle made detect that interference or a blockage (e.g., one of the vehicles entered a tunnel) is interfering with communications between the host vehicle and the target vehicle.

In a situation in which the intermediate vehicle receives a message from a host vehicle to a target vehicle in detects an out-of-range condition between the host vehicle the target vehicle, the intermediate vehicle may relay that message to the target vehicle to increase the likelihood that the target vehicle receives the message from the host. In some embodiments, the intermediate vehicle may simply relay the message from the host vehicle to the target vehicle. In other embodiments, the intermediate vehicle may generate a new message with information about the condition and send a new message directly to the target vehicle. Accordingly, an intermediate vehicle may work in combination with the host vehicle and a target vehicle using DSRC or other communication interface.

Although the examples described above reference a host vehicle, a target vehicle and an intermediate vehicle, there may be multiple host vehicles, intermediate vehicles and target vehicles in a given scenario. Likewise, in various scenarios a given vehicle may function as a host vehicle, and intermediate vehicle, and a target vehicle, depending on the circumstances in which that vehicle is operating. In other words, vehicles can be provided the capability to function as a host vehicle to transmit messages, and intermediate vehicle to relay condition messages to out of range targets as well as a target vehicle to receive messages from a host vehicle or an intermediate vehicle.

Figure 2:
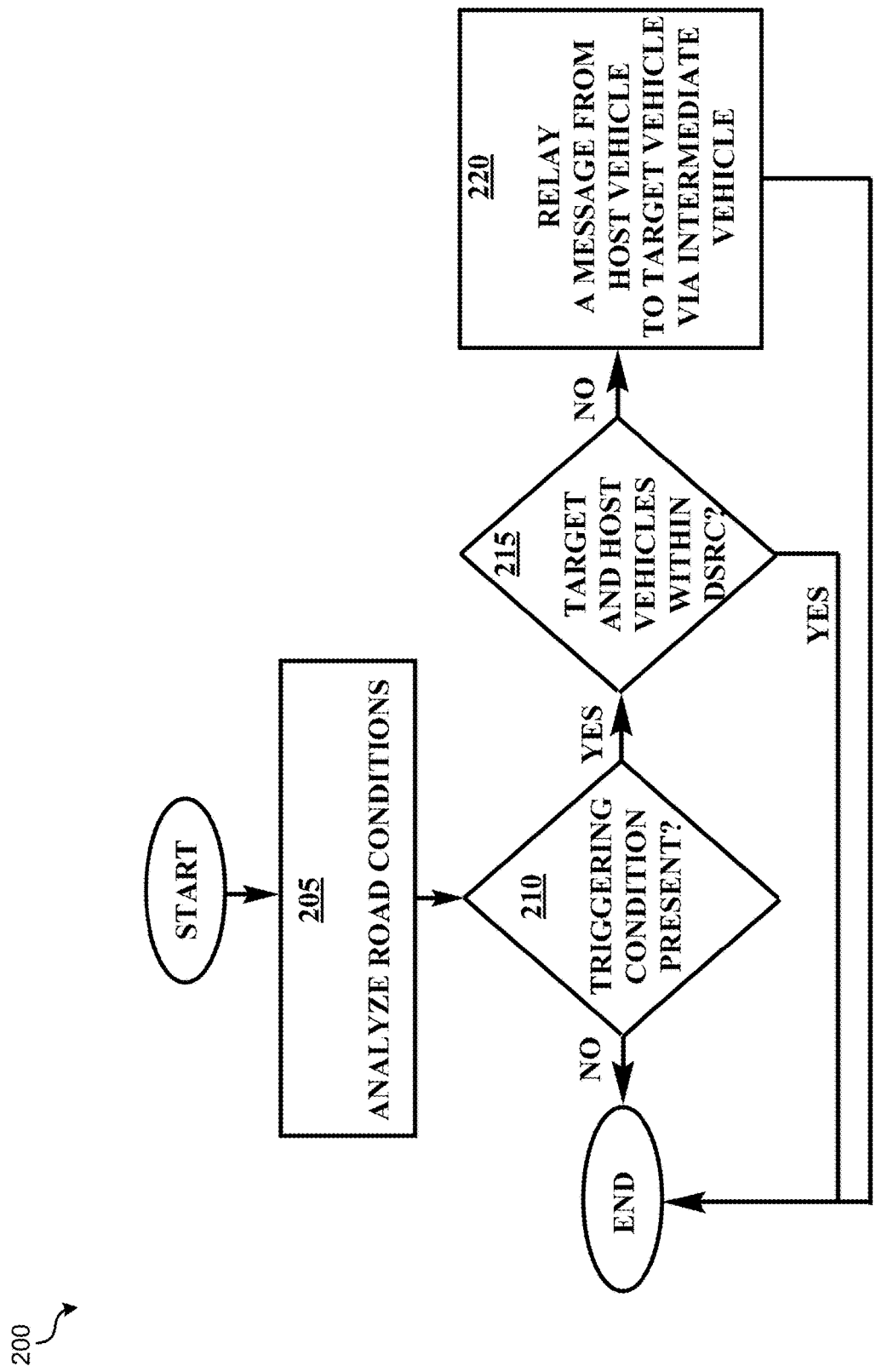
FIG. 2 illustrates a flowchart for sending messages between a host vehicle and a target vehicle outside a DSRC range, in accordance with an embodiment of the methods and systems described herein.

The systems and methods disclosed herein may be implemented with any of a number of different vehicles and vehicle types. For example, the systems and methods disclosed herein may be used with automobiles, trucks, motorcycles, recreational vehicles and other like on-or off-road vehicles. In addition, the principals disclosed herein may also extend to other vehicle types as well. FIG. 1A illustrates an example of a vehicle with which the disclosed technology may be implemented. in accordance with various embodiments. FIG. 2 illustrates a vehicle 182, which may be a hybrid vehicle having an electric motor 184 and an internal combustion engine 186, both of which generate a motive force to move the vehicle. Various types of internal combustion engines may be embodied by internal combustion engine 186, such as a gasoline or diesel engine, for example. Various types of electric motors may be embodied by electric motor 184, such as a brushless direct current (DC) motor, an induction motor, or a DC shunt motor, and so on. Although vehicle 182 is illustrated as a hybrid vehicle, nonhybrid vehicles may be used as well including, for example, electric vehicles, gasoline or diesel powered vehicles, hydrogen powered vehicles, natural gas powered vehicles, and so on.

Vehicle 182 may include a battery 188 for supplying electric power to drive electric motor 184. Battery 188 may be a rechargeable battery, such as, for example, a lead-acid battery, a nickel-cadmium battery, a natrium sulphur battery, a lithium rechargeable battery, a hydrogen rechargeable battery or a redox type battery. Battery 188 may also be a mass storage condenser, or other suitable power source. It should be noted that vehicle 182 may have more than one battery, and applying pre-charge timing as described herein can be coordinated between the multiple batteries.

Although not shown, it should be understood that vehicle 182 may further comprise a battery current/voltage detection sensor for detecting electric current and voltage of battery 188. Vehicle 182 may also include a driver for changing electric current supplied from the battery 188 into an electric value to produce a predetermined torque by electric motor 184. The driver may further control regeneration current flow electric motor 184 to the battery 188. Vehicle 182 may include other un-illustrated components typically found in hybrid vehicles, such as an engine control system, a braking system/components, a steering system/components, logic components, other processors, etc.

Vehicle 182 may include a controller 190 that controls the overall operation of vehicle 182, one or more sensors 192 connected to the controller 190, and a navigation processor 168 also connected to the controller 190. Controller 190 can judge driving conditions based on various detection signals supplied from the one or more sensors 192 in order to define the driving condition of the hybrid vehicle.

In some embodiments, controller 190 may calculate a residual charge of the battery 188 from an electric current value and voltage value of the battery 188. Accordingly, controller 190 may Set a target value for the battery residual charge based on adjusted/optimized traffic conditions predictions which may be supplied to navigation system 164. In this way, the outputs of electric motor 184 and/or internal combustion engine 186 may be adjusted to bring the battery residual charge to a desired target value.

One or more sensors 192 may be included to detect operating characteristics of vehicle 182, such as speed of travel, brake actuation, acceleration, etc. These operational sensors may include, for example, sensors to detect engine operating characteristics (e.g., fuel flow, RPM, oxygen flow, engine oil temperature, and so on), sensors to detect vehicle operating characteristics (e.g., steering input sensors such as a steering wheel encoder, brake sensors to detect the amount of braking applied, sensors to detect the amount of throttle input, and so on) and sensor to detect vehicle dynamics (e.g., accelerometers to detect vehicle roll, pitch and yaw, accelerometers to detect wheel displacement, and so on). Sensors 192 may also be included to detect external characteristics of the vehicle surroundings. These external centers may include, for example, cameras to detect and identify the presence of objects surrounding the vehicle; radar, lidar, infrared or other proximity sensors to detect distance and distance deltas to external objects (e.g., distance to other vehicles, ground clearance, distance to external objects, and so on); temperature, pressure and humidity sensors to detect weather conditions; and other sensors to detect other external conditions. Image sensors can be used to detect, for example, the presence of lanes (e.g. by detecting lines in the road, curbing, medians, etc.), traffic signs, road curvature, obstacles, and so on. While some sensors can be used to actively detect passive environmental objects, other sensors can be included and used to detect active objects such as those objects used to implement smart roadways that may actively transmit data or other information.

In some embodiments, sensors may 182 include their own processing capability to compute the results to detect and identify a road condition. In other embodiments, sensor 130 may be data-gathering-only sensors that provide only raw data to the controller and the controller can use this information, along with information from other sensors, to detect and identify road conditions. In yet further embodiments, hybrid sensors may be included that provide a combination of raw data and processed data to the vehicle controller. Sensors 192 may provide an analog output or a digital output. Where analog outputs are provided, a digital-to-analog converter may be included to digitize the output for data processing in a digital controller.

Signals detected by the one or more sensors 192 may be supplied to controller 190. Controller may be implemented, for example, as a processing device or other circuit to process sensor input to detect one or more conditions that may be of interest to the driver of the vehicle or to drivers of other surrounding vehicles. For example, controller 190 may include one or more processing units, memory storage, and I/O devices. The processing units may execute instructions stored in memory to detect and identify one or more aforementioned conditions of interest. Although not illustrated, other controllers may be used to control one or more electrical systems or subsystems in the vehicle as well as and functions such as doors and door locking, lighting, human-machine interfaces, cruise control, telematics, braking systems (e.g., ABS or ESC), battery management systems, and so on. Also not illustrated, a controller can be included as an ECU (Electronic Control Unit) for the vehicle. These various controllers can be implemented in one processing system, or a separate circuits to control the operation of the various functions.

A navigation system 164 of vehicle 182 may include a navigation processor 170 and a GPS component 172. These systems may be in communication with a navigation server or navigation network 174. In some embodiments, additional components may make up navigation system 164. Navigation system 164 may be a dedicated navigation system for the vehicle, or can be an external navigation system that controller 190 can access to obtain navigation system information. For example, in an external navigation system may include a smart phone navigation application or a dedicated third-party navigation module that may be tethered to the vehicle via a wired or wireless communication interface. Additionally, navigation system 164 may be implemented as a different type of position determination system such as, for example, a dead reckoning system or a cellular or other like triangulation system to determine position. Navigation system 164 may also be implemented as a combination of the foregoing.

One or more of the inputs from sensors 192 and navigation system 164 (and possibly other inputs) may be used by controller 190 to determine or characterize external conditions encountered by vehicle 182. These external conditions may include, for example, road hazards (e.g., the presence of ice and snow on the road, presence of potholes, debris on the roadway, off-road conditions, stop vehicles on the roadway or on the shoulder, road closures, detours and so on) traffic conditions (e.g., slow traffic or traffic jams, vehicles in oncoming lanes, cross traffic at intersections, rapidly breaking vehicles, accidents and so on)

Conditions such as these detected by a vehicle may trigger that vehicle to generate and send an alert to other vehicles within communication range of the detected condition. The alerts can include, for example, information about the detected road, traffic or other conditions that triggered the alert. These can be implemented, for example, as factual information about the condition. These can also be implemented as warnings such as, for example, forward-collision warnings, sudden-braking warnings, do-not-pass warnings, hazardous-conditions-ahead warnings, approaching-emergency-vehicle warning, and so on. These can include other information such as, for example, vehicle safety inspection, transit or emergency vehicle signal priority, electronic parking and toll payments, commercial vehicle clearance and safety inspections, rollover warning, and so on.

Accordingly, the vehicle may be equipped with a communication circuit 194 which may include, for example, a wireless radio transceiver 196 to communicate with other vehicles within its communication range. The communication transceiver 196 may also be used to communicate with other entities such as, for example, intelligent roadway infrastructure elements. Communication circuit 194 may also include a messaging block 198 to generate messages to be sent to other vehicles or to infrastructure elements, and to receive and decode messages from other vehicles and infrastructure elements. In some embodiments, communication circuit 194 is implemented as a DSRC communication system capable of implementing V2V and V2I communications among vehicles and infrastructure elements.

As noted above, when a vehicle encounter scenario such as those scenarios described above, that vehicle may be triggered to broadcast a message to other vehicles to alert them of the detected conditions. It may be desirable that the broadcasting vehicle (a host vehicle in that instance) reach recipient vehicles (target vehicles in this instance) that are out of range of the host vehicles transmitter. Accordingly, in various embodiments in intermediate vehicle positioned within the communication range of the target vehicle and out of range host vehicle may be used as a communication relay to relay the message to the out-of-range target vehicle.

Figure 1B:
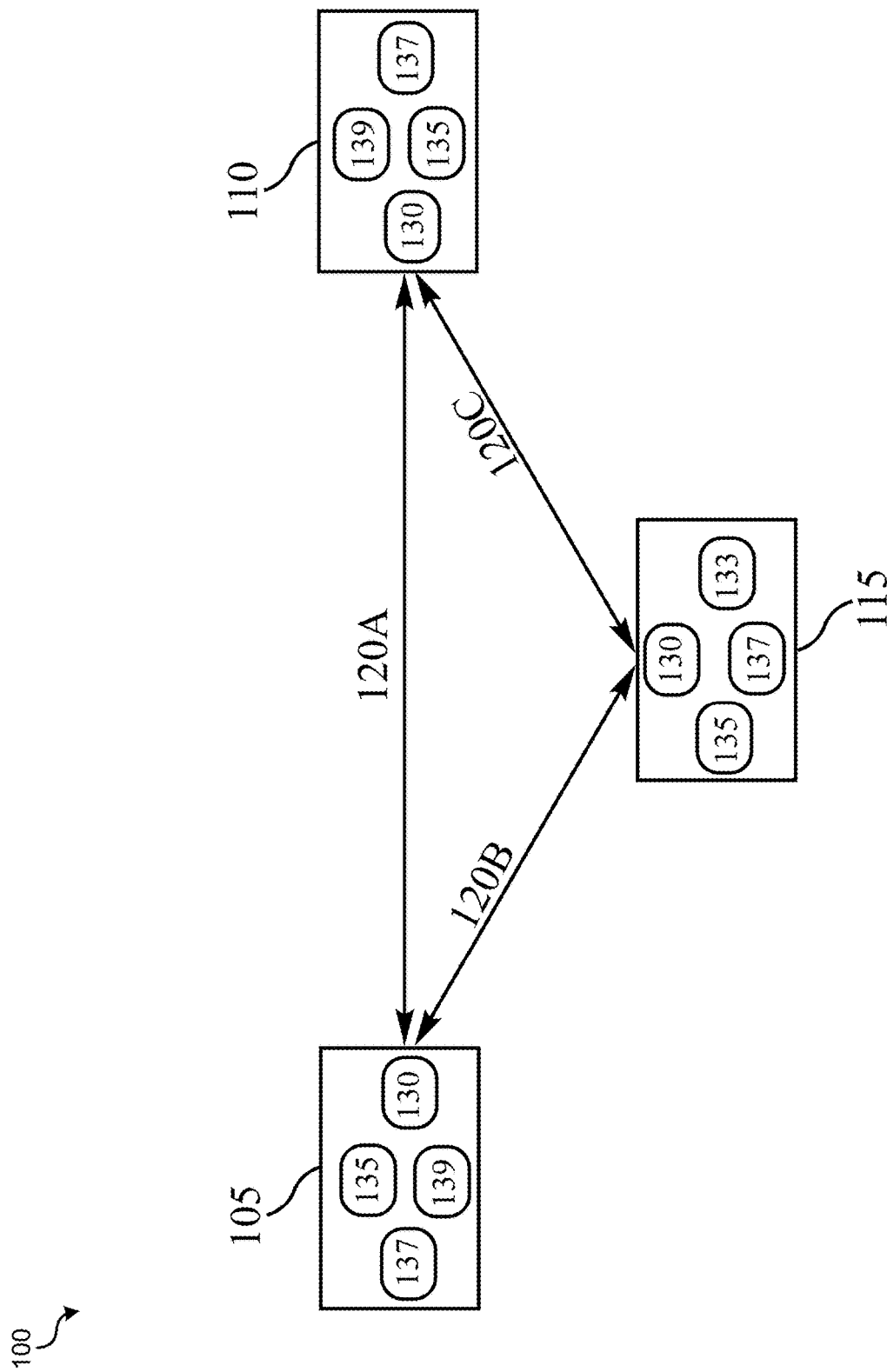
FIG. 1B illustrates an example of a roadside instance where an intermediate vehicle serves as a message relay between a host vehicle and a target vehicle, in accordance with an embodiment of the methods and systems described herein.

FIG. 1B illustrates an example of roadway environment 100 in which an intermediate vehicle serves as a message relay between a host vehicle and a target vehicle. The example illustrated in FIG. 1 includes host vehicle 105, target vehicle 110, and intermediate vehicle 115 as motor vehicles. As also illustrated in this example, these vehicles are also separated by each other by the distance is denoted by vehicle separations 120A-C. In this example, host vehicle 105, target vehicle 110 and intermediate vehicle 115 are equipped with: sensors 130 (e.g., sensors 192 in the example of FIG. 1A), communication unit 135 (e.g. communication circuit 194 in the example of FIG. 1A), user interface (UI) 137 (e.g., a head unit interface), and security module 139.

In some embodiments, sensors 130, communication unit 135, UI 137, and security module 139 may communicate with each other within the vehicle using a communication bus or other internal communication system. As also noted above, vehicles 105, 110, 115 may communicate with each other using a wireless communication interface for a communication unit 135.

As described above with reference to FIG. 1A, an example of sensors 130 may be a 3-axis accelerometer to detect vehicle dynamics (3XAcc). One or more 3-axis accelerometers can be used, for example, to determine acceleration of the vehicle and the vehicle attitude (e.g., roll, pitch and yaw experienced by the vehicle). In accordance with various embodiments, acceleration/deceleration information from the 3-axis accelerometers may be sent to a controller (e.g., controller 210) in the vehicle to calculate acceleration, deceleration, attitude, or other vehicle parameters based on acceleration/deceleration data from the accelerometers. This rate of acceleration or deceleration can be used, for example, when analyzing the road conditions of the vehicle.

UI 137, which generally resides within the interior of host vehicle 105, target vehicle 110, and intermediate vehicle 115, may include a console display and/or a dash display (not explicitly shown in FIG. 1). UI 137 may receive information received by communication circuit 135, which is presented to the driver as a text or audio message, for example, via the console display or dash display. In some embodiments, a display display is configured to provide one or more user interfaces that may include a touch screen or other features for receiving user input such as buttons or switches. Bluetooth or some other communication protocol may be used to synchronize a mobile device (not explicitly shown in FIG. 1) with UI 137, such that communication circuit 135 may send information to the mobile device.

Security module 139 may enforce a security protocol (e.g., a cryptographic protocol or encryption protocol) that includes details about data structures and representations. Cryptographic protocols, for example, may be used for secure application-level data transport. A cryptographic protocol usually incorporates at least one or more of the following: key agreement or establishment entity authentication; symmetric encryption and message authentication material construction; secured application-level data transport; non-repudiation methods; secret sharing methods; and secure multi-party computation. The security protocols may include rules describing the context (i.e., expression of the syntax of the communication) and rules describing the context in which the exchange takes place. (i.e., expression of the semantics of the communication) when messages are sent. Security module 139 may account for at least one of the following when enforcing a security protocol: data formats for data exchange; address formats for data exchange; address mapping; routing; detection of transmission errors; acknowledgements; loss of information from timeouts and retries; direction of information flow; sequence control; and flow control.

In some embodiments, communication circuit 194 in intermediate vehicle 115 may be used to relay V2V messages between host vehicle 105 and one or more target vehicles 110. In some embodiments, host vehicle 105 communicates with target vehicle 110 by way of intermediate vehicle 115 when the distance between host vehicle 105 and target vehicle 110 is greater than the range of their communication capabilities. For example, based on sensor information, controller 182 in an intermediate vehicle 115 may determine that the distance between host vehicle 105 and target vehicle 110 (i.e., separation distance 120A) exceeds the distance range for DSRC communication. More particularly, controller 182 may determine that the separation distance 120A is so great that communication circuit 194 in host vehicle 105 is out of range of communication circuit 194 in target vehicle 110. If this is the case, intermediate vehicle 115 may relay the message that receives from host vehicle 105 and either for that message to target vehicle 110 or generate a new message to target vehicle 110 with the same or similar information.

FIG. 2 is a flowchart illustrating a process for sending messages between a host vehicle and a target vehicle outside a DSRC range in accordance with an embodiment of the methods and systems described herein. At operation 205, a host vehicle operating on a roadway analyzes road conditions such as, for example, by using sensors 182, navigation system 164, or other input information. Controller 190 receives information from these input sources and determines whether a triggering condition exists such as, for example, a road hazard condition, a traffic condition, or other condition for which it is determined that it is appropriate to alert other vehicles. This is illustrated at operation 210. If no triggering condition is present, the system can continue to scan road conditions using sensor and other input information. On the other hand, if controller 190 does determine that a triggering condition exists, it may generate a message to alert other vehicles in the vicinity regarding the condition. In this case, controller 190 may send information to communication circuit 194 to broadcast the message such as, for example, via a DSRC signal. Messaging block 198 may format a message using the appropriate communication protocol then the message can be broadcast by a transmitter of transceiver 196 via one or more antennas (not shown).

For context, consider a simple example of a pothole in a road. In this example, host vehicle proximity sensors may detect the presence of the pothole based on the timing of the return signal received from the proximity sensors. Additionally, accelerometers on the wheels of the host vehicle may detect a sharp drop and quick return of a vehicle wheel indicating that the vehicle struck a pothole. Accelerometers on the chassis of the vehicle may also detect a corresponding role and pitch of the vehicle. Proximity sensors and vehicle camera may also detect the vehicle on the side of the road that may have gotten a flat tire as a result of hitting the pothole. In such an example, controller may detect these conditions and using information regarding the vehicle's position from navigation system 164 generate an alert to vehicles in the vicinity about the hazardous condition at this location. Messaging component 198 can build the message and send a message via transceiver 196.

As another example cameras and proximity sensors in the host vehicle may detect a disabled or otherwise stopped vehicle blocking a lane of traffic. Accordingly, controller 190 can detect and identify the condition and the message sent to vehicles in the vicinity to avoid the blocked lane. Stated another way, in these and other examples, controller 190 determines whether one or more portions of a road may negatively impact target vehicle 110. In some embodiments, controller 190 includes a location of the host vehicle relative to a source of the data associated with current road conditions.

As yet further examples, other triggering conditions detected by host vehicle might include: the host vehicle rounding a corner or entering a tunnel and discovering a stopped vehicle that was not detected; oncoming emergency vehicles; the presence of traffic at an intersection; ice or other hazardous conditions on the roads; a train at a railroad crossing; and so on.

The intermediate vehicle may receive the condition alert message sent by the host vehicle. The intermediate vehicle may also be in communication with other vehicles that may be impacted by the adverse road condition. For example, the intermediate vehicle may detect the presence of a target vehicle that may benefit from the information contained in the condition message. At operation 215, the intermediate vehicle determines whether the host vehicle that sent the condition message and the detected target vehicle are within communication range of one another. If so, the intermediate vehicle need not take any further action as the target vehicle will have received the message. In some embodiments, sensors 192 or information from navigation system 164 may be used to calculate the distance between host vehicle 105 and target vehicle 110. For example, information broadcast by host vehicle 105 and target vehicle 110 that is received by intermediate vehicle 115 may include position information for the vehicles. This position information can be used to determine whether the distance between host vehicle 105 and target vehicle 110 is greater than the communication range of the communication system.

On the other hand, if the intermediate vehicle determines that the host vehicle and the target vehicle are not within communication range of one another, the intermediate vehicle may relay the message to the target vehicle as illustrated at operation 220. In one embodiment, messaging module 198 in intermediate vehicle 115 simply re-broadcasts the message received from host vehicle 105 to target vehicle 110. In another embodiment, messaging module 198 in intermediate vehicle 115 generates and signs a new message with the information contained in the condition message from host vehicle 105 and sends this new message to target vehicle 110. Intermediate vehicle 115 may perform security checks on the message before relaying the message or generating a new message to target vehicle 110.

One example security check is the intermediate vehicle checking to ensure that the host vehicle is characterized as a trusted data source for the target vehicle. Another example security check is performed by validating the host vehicle 105 security from a list of certified, revoked or expired keys. As another example, message elements from host vehicle 105 can be checked to verify whether they have reasonable values (e.g., correct time, size/location/velocity in expected range, etc.). As a further example, the history of message values can be checked to see if they follow a realistic pattern (e.g., speed corresponds with the change of position over time).

Figure 3:
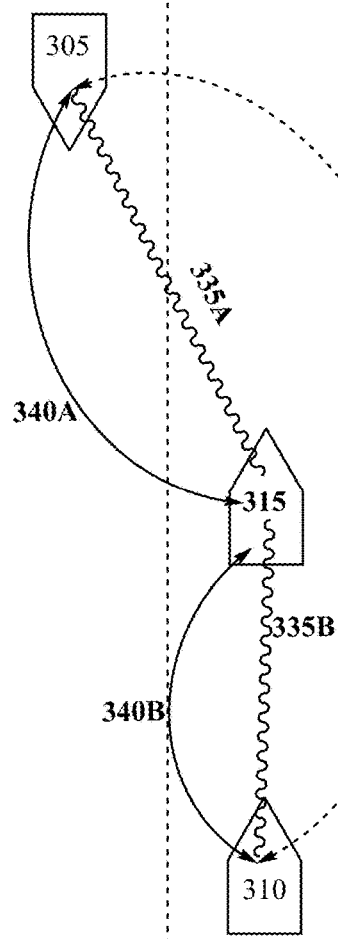
FIG. 3 illustrates an example of using an intermediate vehicle as a message relay between a host vehicle and a target vehicle, where the target vehicle is an oncoming vehicle in relation to the host vehicle, in accordance with an embodiment of the methods and systems described herein.

FIG. 3 illustrates an example of using an intermediate vehicle as a message relay between a host vehicle and a target vehicle, where the target vehicle is an oncoming vehicle in relation to the host vehicle. In roadway 300, host vehicle 305 (which may be similar or identical to host vehicle 105) is traveling in the south bound lane. Traveling in the opposite direction are approaching target vehicle 310 (which may be similar or identical to target vehicle 110) and an intermediate vehicle 315 (which may be similar or identical to intermediate vehicle 315). In this scenario intermediate vehicle 315 is located in between target vehicle 310 and host vehicle 305. Dashed arrow 330 represents a separation distance between target vehicle 310 and host vehicle 305 that is great enough so that they are out of communication range with one another. Arrows 340A and 340B represent separation distances such that DSRC communications are within range between host vehicle 305 and intermediate vehicle 315, and between target vehicle 310 and intermediate vehicle 315, respectively. Host vehicle 305 broadcasts information that may be important for target vehicle 310, so that the driver of target vehicle 310 will know not to pass the intermediate vehicle 315. For example, host vehicle 305 may broadcast its location and velocity information for oncoming vehicles. However, because intermediate vehicle 315 is the only vehicle in range in this scenario, as illustrated by signal 335A the location and velocity information (e.g., in a message) are transmitted from host vehicle 305 to intermediate vehicle 315. The distance 340B allows signal 335B to transmit this information from intermediate vehicle 315 to target vehicle 310. Upon receipt, the driver of target vehicle 310 knows the position and speed of oncoming host vehicle 305 and can make an informed decision whether to pass.

In some applications, the target vehicle 310 can also be sending information such as, throttle position, turn signal information, among others. This information might inform other vehicles regarding target vehicle's 310 intention to pass. This could increase the urgency of relaying the information from host vehicle 305 to target vehicle 310. Likewise, target vehicle 310 could become a host vehicle and host vehicle 305 the target vehicle for this information, with vehicle 315 again being the intermediary. Sending this information from target (now host) vehicle 310 to host (now target) vehicle 305 could inform the driver of vehicle 305 about the possible danger of vehicle 310 attempting a passing maneuver.

Figure 4:
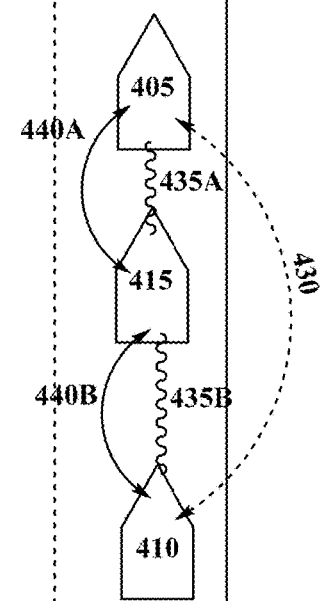
FIG. 4 illustrates an example of using an intermediate vehicle as a message relay between a host vehicle and a target vehicle, where the host vehicle; intermediate vehicle; and target vehicle are traveling in the same direction as the convoy, in accordance with an embodiment of the methods and systems described herein.

FIG. 4 illustrates an example of using an intermediate vehicle as a message relay between a host vehicle and a target vehicle, where the host vehicle; intermediate vehicle; and target vehicle are traveling in the same direction as in a convoy. In roadway 400, target vehicle 410 (which may be similar or identical to target vehicle 110) is a trailing vehicle relative to host vehicle 405 (which may be similar or identical to host vehicle 105), where host vehicle 405 experiences loss of traction and intermediate vehicle 415

(which may be similar or identical to intermediate vehicle 115) is located in between target vehicle 410 and host vehicle 405. Dashed arrow 430 represents a separation where DSRC is out of range between target vehicle 410 and host vehicle 405.—Darrow's 440A and 440B represent separation where DSRC is within range between target vehicle 410 and intermediate vehicle 415; and host vehicle 405 and intermediate vehicle 415, respectively. Communication 440B allows pathway 435B to transmit a message from host vehicle 405 to intermediate vehicle 415 indicating that host vehicle 405 is experiencing traction control issues. Communication 440A allows pathway 435A to transmit the message that host vehicle 405 is experiencing traction control issues from intermediate vehicle 415 to target vehicle 410.

Figure 5:
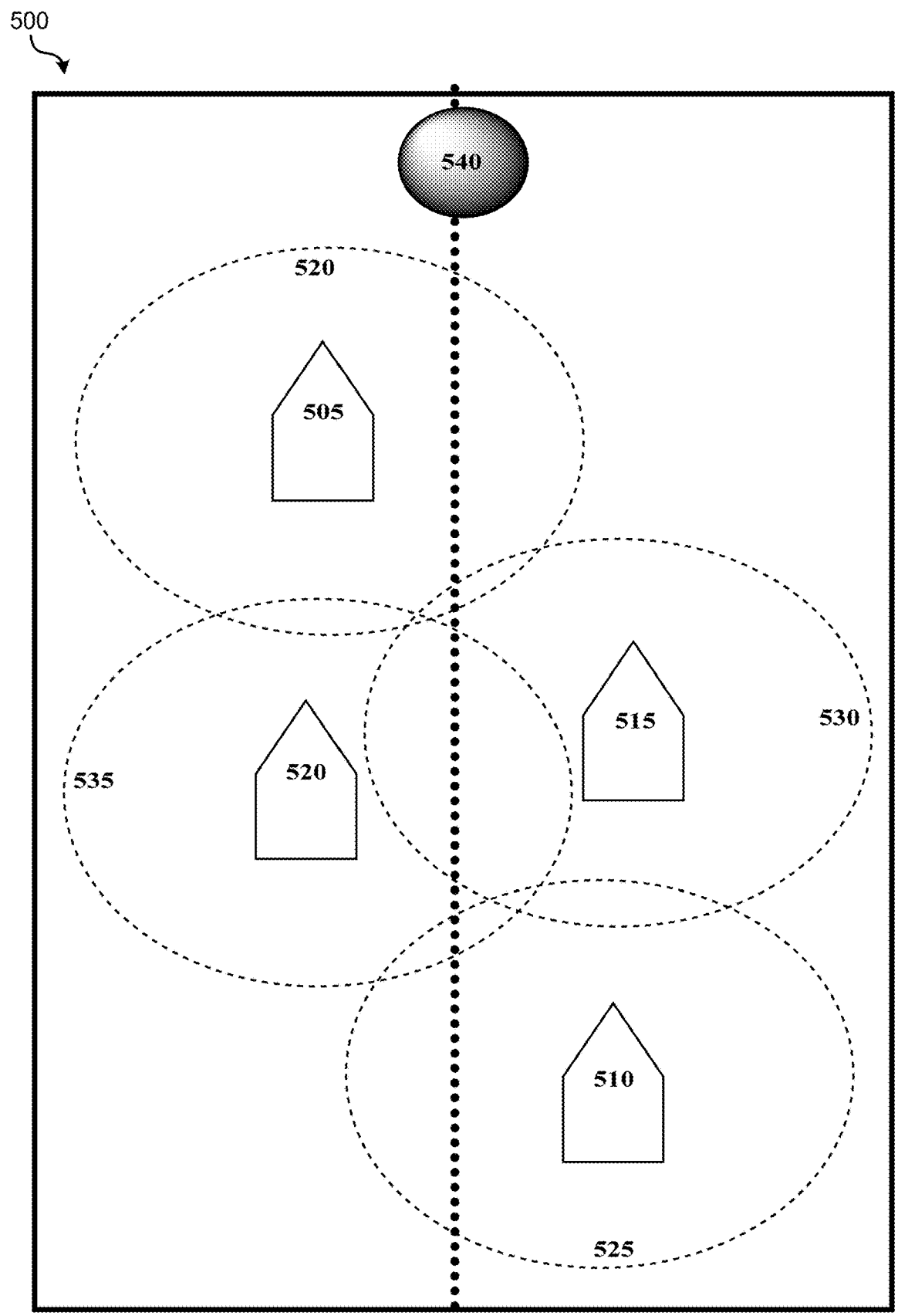
FIG. 5 illustrates an example of using an intermediate vehicle as a message relay between a host vehicle and a target vehicle, where there are more than one possible intermediate vehicle that may serve as the relay, in accordance with an embodiment of the methods and systems described herein.

FIG. 5 illustrates an example of using an intermediate vehicle as a message relay between a host vehicle and a target vehicle, where there are more than one possible intermediate vehicles that may serve as the relay. In roadway 500, obstacle 540 is the source of a road condition that poses a hazard to vehicle 505 and vehicle 510. Vehicle 505 is the host vehicle; vehicle 510 is the target vehicle; and vehicles 515 and 520 are the potential intermediate vehicle. In some embodiments, communication range 520 of vehicle 505 does not overlap with communication range 525 of vehicle 510, whereas communication range 535 of vehicle 520 and communication range 530 of vehicle 515 both overlap with communication ranges 520 and 525. In an embodiment, vehicles 515 and 520 are located in between vehicles 505 and 510. Thus, vehicles 515 and 520 are suitable candidates to be intermediate vehicles for relay a message from vehicle 505 to vehicle 510.

Message transmission may not achieve optimal efficiency when there are more than one possible intermediate vehicles. In other words, it might not be efficient for multiple vehicles to relay the same message to a target vehicle. Accordingly, embodiments may be implemented to allow a plurality of possible intermediate vehicles to select one of the plurality of intermediate vehicles to be the relay. For example, communication circuits within the vehicles may be given random priority numbers that can be used to determine the relative priority of the possible intermediate vehicles. As another example, a potential intermediate vehicle can check to determine whether the message has already been relayed. If it has not, it can continue the operation and relay the message. Whereas, if it sees that the message is already been relayed by another intermediate vehicle, it can disregard the subject condition message.

Figure 6:
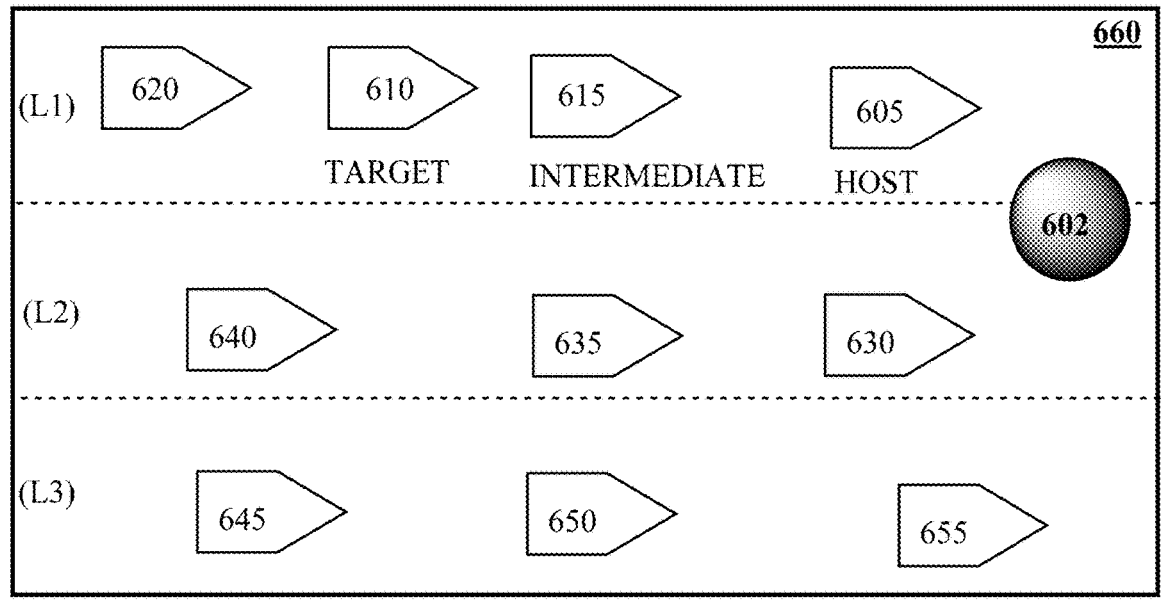
FIG. 6 illustrates an example of creating a message relay chain, in accordance with an embodiment of the methods and systems described herein.
Figure 6:
Figure 6:
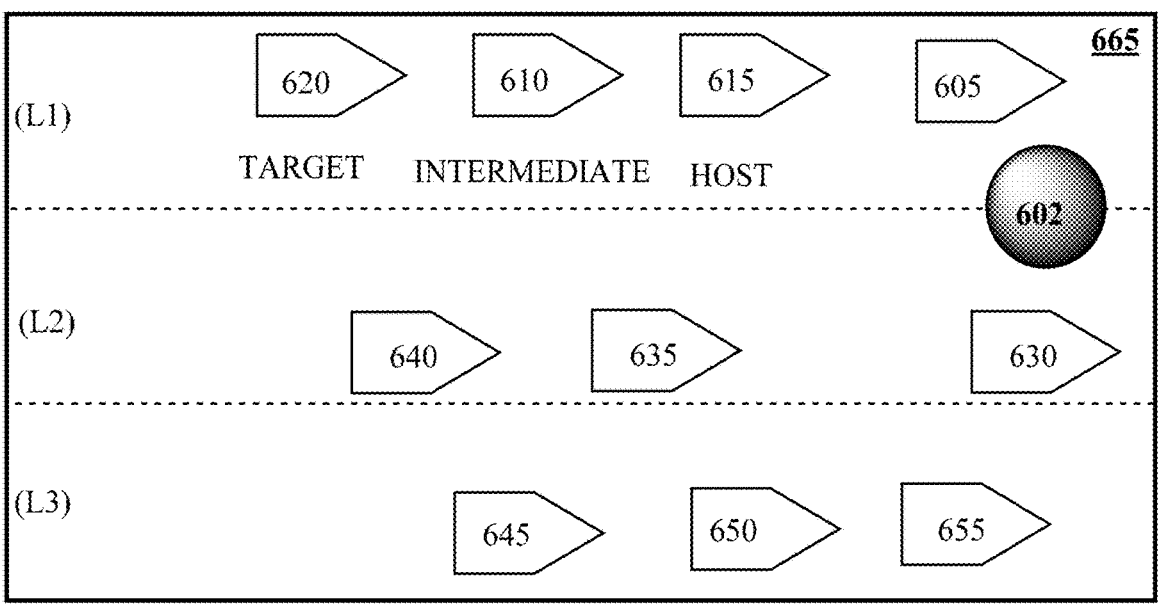

FIG. 6 illustrates an example of creating a message relay chain. Roadway 600 depicts a three-lane highway at instance 660 and instance 665. Instance 665 occurs at a later time than instance 660. In one example, condition 602 is a disabled vehicle stranded in lanes L1 and L2. Vehicles 605, 615, 610, and 620 are traveling in the same direction along L1, where vehicle 605 is the host vehicle, vehicle 615 is the intermediate vehicle, and vehicle 610 is the target vehicle, in instance 660. Vehicles 630, 635, and 640 are driving along L2; and vehicles 655, 650, and 645 are driving along L3 in instances 660 and 665. At instance 660, vehicle 615 is the intermediate vehicle between host vehicle 605 and target vehicle 610. Host vehicle 605 may send a message instructing the vehicles to move to the left when approaching source 602. Where target vehicle 610 is out of the range of host vehicle 605, interviewed media vehicle 615 may detect this out-of-range condition and relay the message to target vehicle 610. Similarly, target vehicle 610 may sense that intermediate vehicle 615 he is out of range of vehicle 620. Accordingly, target vehicle 610 may become the intermediate vehicle between vehicle 615 (now a host vehicle) and target vehicle 620.

Figure 7:
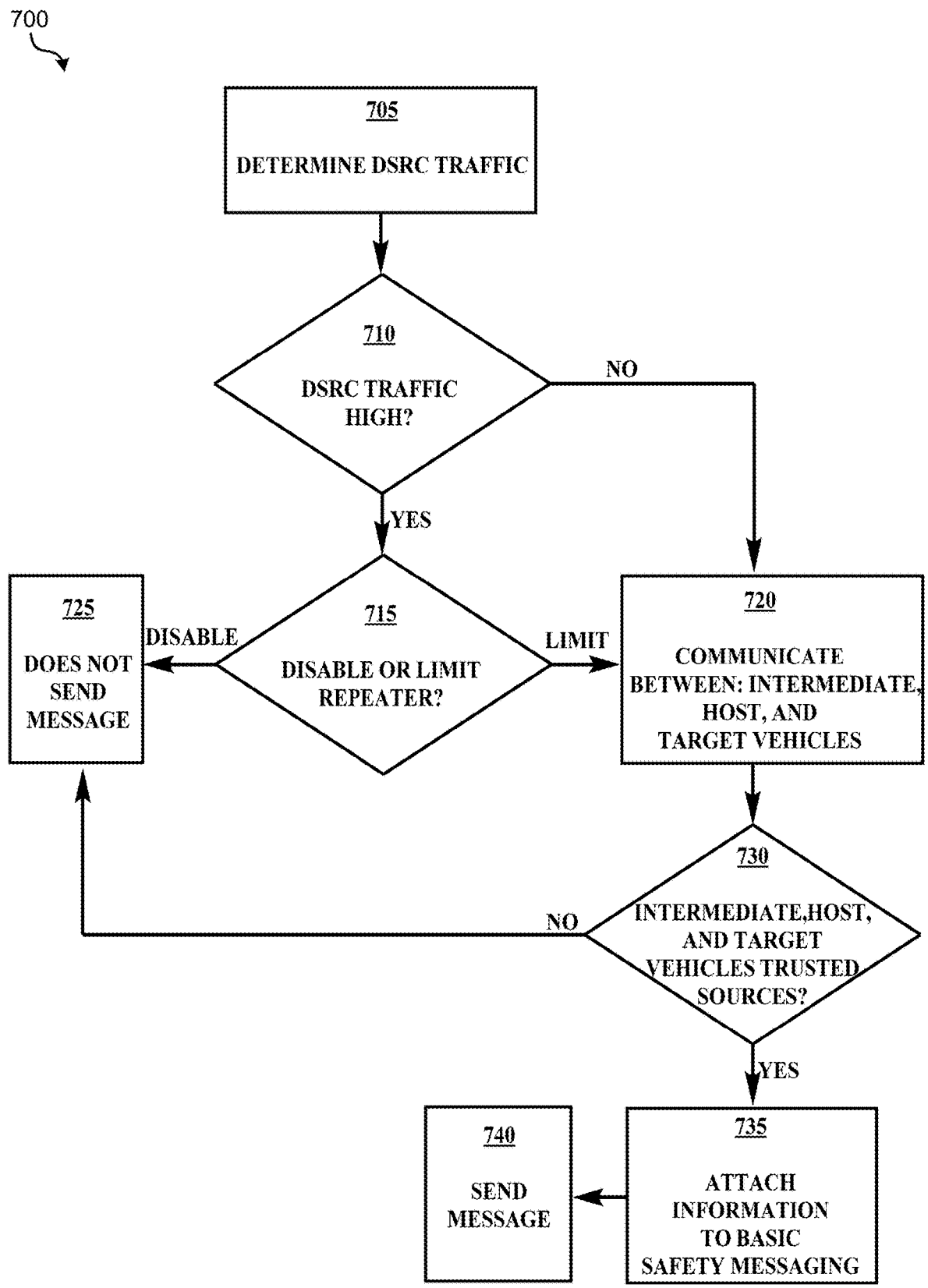
FIG. 7 illustrates a flowchart for sending messages between a host vehicle and a target vehicle, based on DSRC traffic, in accordance with an embodiment of the methods and systems described herein.

FIG. 7 illustrates a flowchart for sending messages between a host vehicle and a target vehicle, based on an embodiment implementing DSRC messaging. Messaging component within an intermediate vehicle located between a host vehicle and a target vehicle performs the operations in flowchart 700.

At operation 705, the messaging component receives DSRC traffic from a host vehicle indicating that a triggering condition is present. The intermediate vehicle may determine that a target vehicle is out of range of the host vehicle and a communication relay may be desirable.

At operation 710, the messaging component of the intermediate vehicle determines whether DSRC traffic is high. Stated another way, the messaging component may compare the volume of received traffic to a preconfigured traffic threshold associated established for the system. Issues may occur if DSRC traffic is high, such as unnecessarily high levels of interference and message loss. Where the traffic is above a threshold, the operation branches to operation 715, where the repeater feature of the intermediate vehicle may be disabled or limited. If, on the other hand, the traffic levels are not too high, then the system proceeds to operation 720.

Where the repeater feature of the intermediate vehicle is disabled, no messages are relayed. This is illustrated at operation 725. For example, in some embodiments repeater unit 135 of intermediate vehicle 115 may generate original communications only and may not perform any relay operations. As another example, the intermediate vehicle may perform limited relay operation such as, for example, only high-priority or emergency messages are relayed.

At operation 720, the intermediate vehicle communicates between the intermediate, host, and target vehicles. A DSRC or other communication pathway (e.g., communications 335B and 445B) is setup between the intermediate vehicle and the host vehicle; and another DSRC pathway (e.g., communications 335A and 445A) is setup between the intermediate vehicle and the target vehicle.

If messaging module 133 limits the repeater at operation 715 or determines the DSRC traffic is not high, then messaging module 133 determines whether the intermediate, host, and target vehicles are trusted sources at operation 730. In some embodiments, the intermediate vehicle (e.g., intermediate vehicle 115) is a trusted source using DSRC messaging protocols. In other embodiments, the host vehicle (e.g., host vehicle 105) is characterized as a trusted data source for the target vehicle (e.g., target vehicle 110), based on an advanced encryption standard (AES). The messaging component of the intermediate vehicle may communicate with the security modules 139 of host vehicle 105 and target vehicle 110. More particularly, the intermediate vehicle may receive a security encryption from host vehicle 105 and an associated time stamp that accompany the message. The time stamp is used by messaging module 133 to determine whether the message will be sent to target vehicle 110 within an appropriate time frame as to effectively send a warning of a triggering condition that may negatively impact target vehicle 110 to UI 137 at target vehicle 110.

If the messaging component at the intermediate vehicle determines the intermediate, host, and target vehicles are trusted sources at operation 730, then the messaging component attaches information to the basic safety messaging at operation 735. The basic safety messaging is a system residing within the intermediate vehicle (e.g., intermediate vehicle 115). In some embodiments, the messaging component processes the relevant portions of the current road conditions data as if the one or more relevant portions of the current road conditions data originated directly from the host vehicle (e.g., host vehicle 105) and appends the relevant portions to the basic safety messaging system.

At operation 740, the messaging component of the intermediate vehicle sends a message to the target vehicle. The message is sent within a specified time window to maintain message validity (e.g., encryption validity). In some embodiments, messaging module 133 alters and re-signs the message with encryption and time. In turn, target vehicle 110 receives the altered and re-signed message with the encryption and time and decodes the altered and re-signed message with the encryption and time. In some embodiments, the messaging component, which processes the relevant portions of the data associated with the road conditions data contributing to the triggering conditions, transmits a message displayed in UI 137 of target 110 as if the relevant portions of the data associated with the road conditions data originated directly from host vehicle 105. In an exemplary embodiment, the message is presented to UI 137 of target 110 in real time, wherein the message describes the relevant portions of the data associated with the hazardous condition.

Figure 8:
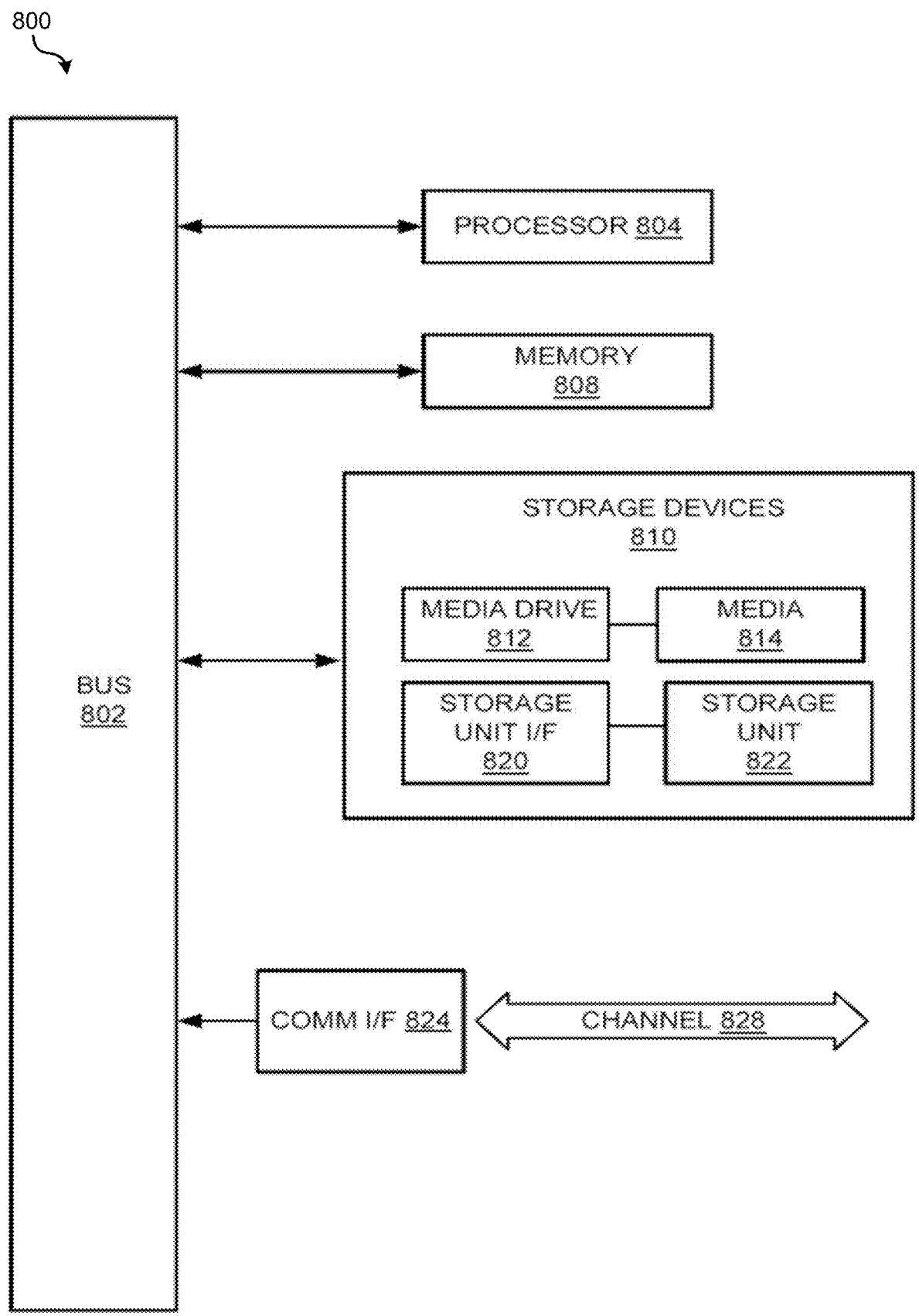
FIG. 8 illustrates an example computing module that may be used in implementing various features of embodiments of the disclosed technology.

Referring now to FIG. 8, computing system 800 may represent, for example, computing or processing capabilities found within desktop, laptop and notebook computers; hand-held computing devices (smart phones, cell phones, palmtops, tablets, etc.); mainframes, supercomputers, workstations or servers; or any other type of special-purpose or general-purpose computing devices as may be desirable or appropriate for a given application or environment. Computing system 800 might also represent computing capabilities embedded within or otherwise available to a given device. For example, a computing system might be found in other electronic devices such as, for example, digital cameras, navigation systems, cellular telephones, portable computing devices, modems, routers, WAPs, terminals and other electronic devices that might include some form of processing capability.

Computing system 800 might include, for example, one or more processors, controllers, control modules, or other processing devices, such as a processor 804. Processor 804 might be implemented using a general-purpose or special-purpose processing engine such as, for example, a microprocessor (whether single-, dual- or multi-core processor), signal processor, graphics processor (e.g., GPU) controller, or other control logic. In the illustrated example, processor 804 is connected to a bus 802, although any communication medium can be used to facilitate interaction with other components of computing system 800 or to communicate externally.

Computing system 800 might also include one or more memory modules, simply referred to herein as main memory 808. For example, in some embodiments random access memory (RAM) or other dynamic memory, might be used for storing information and instructions to be executed by processor 804. Main memory 808 might also be used for storing temporary variables or other intermediate information during execution of instructions to be executed by processor 804. Computing system 800 might likewise include a read only memory ("ROM") or other static storage device coupled to bus 802 for storing static information and instructions for processor 804.

The computing system 800 might also include one or more various forms of information storage mechanism, such as storage devices 810. Storage device 810 might include, for example, a media drive 812 and a storage unit interface (I/F) 820. The media drive 812 might include a drive or other mechanism to support fixed or removable storage media 814. For example, a hard disk drive, a floppy disk drive, a magnetic tape drive, an optical disk drive, a CD or DVD drive (R or RW), a flash drive, or other removable or fixed media drive might be provided. Accordingly, storage media 814 might include, for example, a hard disk, a floppy disk, magnetic tape, cartridge, optical disk, a CD or DVD, or other fixed or removable medium that is read by, written to or accessed by media drive 812. As these examples illustrate, the storage media 814 can include a computer usable storage medium having stored therein computer software or data.

In alternative embodiments, storage devices 810 might include other similar instrumentalities for allowing computer programs or other instructions or data to be loaded into computing system 800. Such instrumentalities might include, for example, a fixed or removable storage unit 822 and an interface 820. Examples of such storage units 822 and interfaces 720 can include a program cartridge and cartridge interface, a removable memory (for example, a flash memory or other removable memory module) and memory slot, a flash drive and associated slot (for example, a USB drive), a PCMCIA slot and card, and other fixed or removable storage units 822 and interfaces 820 that allow software and data to be transferred from the storage unit 822 to computing system 800.

Computing system 800 might also include a communications interface 824. Communications interface 824 might be used to allow software and data to be transferred between computing system 800 and external devices. Examples of communications interface 724 might include a modem or soft modem, a network interface (such as an Ethernet, network interface card, WiMedia, IEEE 802.XX, Bluetooth®, or other interface), a communications port (such as for example, a USB port, IR port, RS232 port, or other port), or other communications interface. Software and data transferred via communications interface 824 might typically be carried on signals, which can be electronic, electromagnetic (which includes optical) or other signals capable of being exchanged by a given communications interface 824. These signals might be provided to communications interface 824 via a channel 828. This channel 828 might carry signals and might be implemented using a wired or wireless communication medium. Some examples of a channel might include a phone line, a cellular link, an RF link, an optical link, a network interface, a local or wide area network, and other wired or wireless communications channels.

In this document, the terms "computer program medium" and "computer usable medium" are used to generally refer to media such as, for example, memory 808, storage unit 820, media 814, and channel 828. These and other various forms of computer program media or computer usable media may be involved in carrying one or more sequences of one or more instructions to a processing device for execution. Such instructions embodied on the medium, are generally referred to as "computer program code" or a "computer program product" (which may be grouped in the form of computer programs or other groupings). When executed, such instructions might enable the computing system 800 to perform features or functions of the disclosed technology as discussed herein.

While various embodiments of the disclosed technology have been described above, it should be understood that they have been presented by way of example only, and not of limitation. Likewise, the various diagrams may depict an example architectural or other configuration for the disclosed technology, which is done to aid in understanding the

What is claimed is:

1. A method comprising:
obtaining at an intermediate vehicle, data regarding road conditions relevant to at least the intermediate vehicle and a target vehicle, the obtained data having been sent by a host vehicle and including a triggering condition identified by the host vehicle;
determining, at the intermediate vehicle, that a location of the host vehicle relative to a location of the target vehicle is outside a communications threshold; and
relaying a message detailing the triggering condition from the intermediate vehicle to the target vehicle.

2. The method of claim 1, wherein determining the location of the host vehicle relative to the location of the target vehicle is outside the communications threshold, comprises:
establishing a first connection between the intermediate vehicle to the host vehicle; and
establishing a second connection between the intermediate vehicle to the target vehicle.

3. The method of claim 1, wherein identifying the triggering condition, comprises:
analyzing the obtained data to identify a portion of the road conditions negatively impacting the at least one of the intermediate vehicle and the target vehicle.

4. The method of claim 1, wherein sending the message from the intermediate vehicle to the target vehicle, further comprises:
verifying at least one of the intermediate vehicle and the host vehicle is a trusted source for the target vehicle by using dedicated short range communication (DSRC) messaging protocols at the intermediate vehicle;
altering and security re-signing the message; and
retransmitting the altered and re-signed message to the target vehicle.

5. The method of claim 1, wherein the triggering condition includes at least one of:
traction control loss of the host vehicle;
brake failure in the host vehicle;
possible collision between the host and the target vehicle;
movement and position by the host vehicle requiring a reaction by the target vehicle; and
maneuvers attempting to pass the host vehicle is risky to the target vehicle.

6. A method comprising:
obtaining at an intermediate vehicle, data regarding road conditions relevant to at least the intermediate vehicle and a target vehicle, the obtained data having been sent by a host vehicle and including a triggering condition identified by the host vehicle;
determining, at the intermediate vehicle, that a location of the host vehicle relative to a location of the target vehicle is outside a communications threshold;
determining whether dedicated short range communication (DSRC) traffic exceeds a network traffic threshold; and
sending a message detailing the triggering condition from the intermediate vehicle to the target vehicle.

7. The method of claim 6, wherein in response to determining the DSRC traffic exceeds the network traffic threshold, disabling a repeater feature of the first vehicle, and generating an original communications reflecting the triggering condition for transmission to the target vehicle.

8. The method of claim 6, wherein determining the location of the host vehicle relative to the location of the target vehicle is outside the communications threshold, comprises:
   establishing a first connection between the intermediate vehicle to the first vehicle; and
   establishing a second connection between the intermediate vehicle to the target vehicle.

9. The method of claim 6, wherein identifying the triggering condition, comprises:
   analyzing the obtained data to identify a portion of the road conditions negatively impacting the at least one of the intermediate vehicle and the target vehicle.

10. The method of claim 6, wherein sending the message from the intermediate vehicle to the target vehicle, further comprises:
    verifying at least one of the intermediate vehicle and the host vehicle is a trusted source for the target vehicle by using dedicated short range communication (DSRC) messaging protocols at the intermediate vehicle;
    altering and security re-signing the message; and
    retransmitting the altered and security re-signed message to the target vehicle.

11. The method of claim 6, wherein the triggering condition includes at least one of:
    traction control loss of the host vehicle;
    brake failure in the host vehicle;
    possible collision between the host and the target vehicle;
    movement and position by the host vehicle requiring a reaction by the target vehicle; and
    maneuvers attempting to pass the host vehicle is risky to the target vehicle.

12. A computer system, comprising:
    one or more computer processors;
    one or more repeater features;
    one or more sensors;
    one or more user interfaces;
    one or more non-transitory computer readable storage media;
    program instructions stored on the one or more computer readable storage media for execution by at least one of the one or more processors, the program instructions comprising:
      program instructions to obtain at an intermediate vehicle, data regarding road conditions relevant to at least the intermediate vehicle and a target vehicle, at a third vehicle, the obtained data having been sent by a host vehicle and including a triggering condition identified by the host vehicle;
      program instructions to determine, at the intermediate vehicle, that a location of the host vehicle relative to a location of the target vehicle is outside a communications threshold;
      program instructions to determine whether dedicated short range communication (DSRC) traffic exceeds a network traffic threshold; and
      program instructions to send a message detailing the triggering condition from the intermediate vehicle to the target vehicle.

13. The computer system of claim 12, wherein program instructions to, in response to a determination that the DSRC traffic exceeds the network traffic threshold, comprise:
    program instructions to disable a repeater feature in the intermediate vehicle, and generate an original communications reflecting the triggering condition for transmission to the target vehicle.

14. The computer system of claim 12, wherein program instructions to determine the location of the host vehicle relative to the location of the target vehicle is outside the communications threshold, comprise:
    program instructions to establish a first connection between the intermediate vehicle to the host vehicle; and
    program instructions to establish a second connection between the intermediate vehicle to the target vehicle.

15. The computer system of claim 12, wherein program instructions to identify the triggering condition, comprise:
    program instructions to analyze the obtained data to identify a portion of the road conditions negatively impacting the at least one of the intermediate vehicle and the target vehicle.

16. The computer system of claim 12, wherein program instructions to send the message from the intermediate vehicle to the target vehicle, further comprise:
    program instructions to verify at least one of the intermediate vehicle and the host vehicle is a trusted source for the target vehicle by using dedicated short range communication (DSRC) messaging protocols at the intermediate vehicle;
    program instructions to alter and security re-sign the message; and
    program instructions to retransmit the altered and re-signed message to the target vehicle.

17. The computer system of claim 12, wherein the triggering condition includes at least one of:
    traction control loss of the host vehicle;
    brake failure in the host vehicle;
    possible collision between the host and the target vehicle;
    movement and position by the host vehicle requiring a reaction by the target vehicle; and
    maneuvers attempting to pass the host vehicle is risky to the target vehicle.

* * * * *